Figure 1:
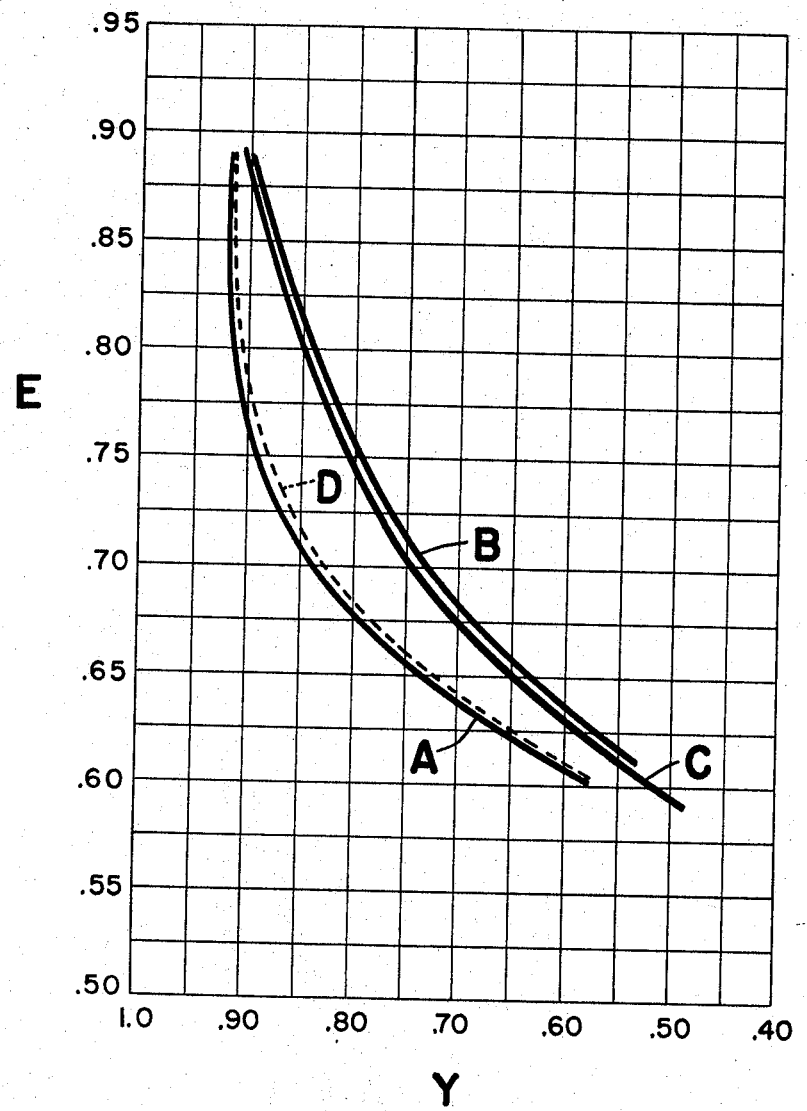

June 20, 1967  R. V. HARRINGTON  3,326,703
HEAT-ABSORBING GLASS

Filed May 10, 1963  2 Sheets-Sheet 2

INVENTORS
Roy V. Harrington
Bruce R. Karstetter
BY Clarence R. Patty, Jr.
THEIR ATTORNEY 3,326,703
HEAT-ABSORBING GLASS
Roy V. Harrington and Bruce R. Karstetter, Corning, N.Y., assignors to Corning Glass Works, Corning, N.Y., a corporation of New York
Filed May 10, 1963, Ser. No. 279,549
7 Claims. (Cl. 106—54)

This invention relates to heat-absorbing glasses and in particular to heat-absorbing glasses possessing improved physical properties.

The property of such glasses to absorb a substantial quantity of heat while readily transmitting visible light is desirable for purposes such as the manufacture of heat-shielding, transparent windowpanes or lenses or filters for projection equipment.

Commercial heat-absorbing glasses may be classified in four general types: (1) phosphate glasses; (2) soda-lime silica glasses; (3) borosilicate glasses, and (4) aluminosilicate glasses. Each of the types of glasses outlined depends for heat-absorbing properties on the presence of ferrous iron in the glass composition.

The phosphate glasses exhibit the highest efficiency of heat-absorption. However, phosphate glasses are frequently undesirable as a result of their poor chemical durability or high cost of production. In other heat-absorbing glasses, lower heat-absorbing efficiency has been accepted heretofore in an attempt to provide a glass which is less expensive and/or possesses more desirable physical properties such as chemical durability, heat-resistance, etc.

Heat-absorbing glasses tend to become quite warm when exposed to a strong source of infrared radiation such as the sun. Windows made from such glasses may frequently be subjected to thermal shock in the form of sharp temperature gradients created when the window is partly in a shadow and partly exposed to bright sunlight. To minimize the possibility of cracking under such circumstances, it is particularly desirable that the glass have a low coefficient of thermal expansion, preferably below $60 \times 10^{-7}$ cm./cm./° C. in the 0° to 300° C. range.

It is an object of the present invention to provide a new glass having a heat-absorbing efficiency comparable to that of the heat-absorbing phosphate glasses while possessing a good chemical durability, low coefficient of expansion and economy of production. It is a further object to provide a low expansion, durable, heat-resistant, heat-absorbing, boroaluminosilicate glass.

These and other objects may be attained by means of the present invention which resides in a heat-absorbing boroaluminosilicate glass containing a small amount of ferrous iron and having a coefficient of thermal expansion of less than $60 \times 10^{-7}$ in the 0° to 300° C. range. The glasses of the present invention are characterized by a composition on a weight percent basis as calculated from the batch, consisting essentially of 35 to 70% $SiO_2$, 5 to 30% $Al_2O_3$, 4 to 25% $B_2O_3$, 2 to 25% of a divalent metal oxide selected from the group consisting of ZnO and CdO, 5 to 30% of a divalent metal oxide selected from the group consisting of CaO, MgO and BaO, 0.25 to 5.0% FeO, 0 to 3% F, 0 to 5% of an alkali metal oxide selected from the group consisting of $Li_2O$, $Na_2O$ and $K_2O$, said MgO, if present, being in an amount no greater than 15%. The presence of iron in the ferrous state is assured by the addition of a reducing agent to the batch. Cornstarch, sugar, Al, SnO or other conventional reducing agents may be used. The reducing agent should be present in the batch in an amount in excess of the stoichiometric amount necessary to reduce all iron oxides present to FeO.

The amounts of the various components of the glasses of the present invention may vary within the ranges set forth above. The ranges have been established on the basis of the following considerations. Less than 35% $SiO_2$ adversely affects the weathering resistance of the glass, while greater than 70% results in a glass that is difficult to melt. Less than 5% $Al_2O_3$ lowers the weathering resistance of the glass unduly, while greater than 30% renders the glass difficult to melt and causes an undesirable increase in the liquidus temperature of the glass. If less than 4% $B_2O_3$ is incorporated into the glass, melting difficulties are encountered, and the liquidus temperature of the glass is raised unduly. Greater than 25% $B_2O_3$ adversely affects the weathering resistance of the glass.

In order to obtain satisfactory melting properties, the sum of the CaO, MgO and BaO should be in excess of about 5% of the glass composition and MgO, if present, should not exceed about 15% of the glass composition. However, if the total of these three oxides exceeds about 30% of the glass composition, the thermal expansion of the glass is raised unduly and poor weathering resistance is encountered.

If the amount of FeO in the glass composition is less than about .25%, the heat-absorption of the glass is lower than that desired for purposes of this invention. If FeO is present in excess of 5%, transmission of visible light is unsatisfactorily low.

Amounts of alkali up to about 5% may be incorporated as a flux or to lower the electrical resistivity of the glass to make it suitable for electric melting. For this purpose $Li_2O$, $Na_2O$ or $K_2O$ may be employed, $Na_2O$ being preferred because it is less expensive. The presence of alkali metal oxides in excess of 5% tends to unduly increase the coefficient of thermal expansion and lower the heat-absorption efficiency of the glass.

The amount of fluoride that can be used as a flux will be different in each glass. An excessive amount will produce opalization. A practical limit for most glasses in the field can be considered to be about 3%.

Cornstarch, sugar, Al, SnO or other conventional reducing agents may be used to assure the reduction of the iron present to the FeO state. Less than about .5% by weight of cornstarch is inadequate to properly reduce the iron to the desired state, while greater than 5% cornstarch is deemed unnecessary. Other reducing agents may be used in an amount sufficient to give a reduction of $Fe_2O_3$ to FeO equivalent to that of between .5 and 5% cornstarch. In any event, the amount added should be in excess of the stoichiometric amount required for complete reduction of the $Fe_2O_3$ to FeO.

The excess reducing agent, while desirable from the standpoint of assuring substantially complete reduction of $Fe_2O_3$ to $FeO$, may result in the presence of black streaks in the final glass. The presence of $ZnO$ (or an equal amount of $CdO$) in an amount of greater than 2% eliminates this phenomenon. More than 25% is unnecessary and increases the cost of the glass unduly.

The desirable properties of the glasses of the present invention may be further enhanced by the application of films or coatings to the surface of the finished articles. The glasses are well adapted for use in the manufacture of windows, windshields, filters or reflectors. For such uses, it is frequently desirable to apply a transparent electroconductive film such as a tin oxide film, by means of which the glass may be electrically heated to prevent the accumulation of ice or snow on the surface. Films may also be used to control the emissivity or reflectivity of the surface. It has been found that the presence of alkali metal oxides in the glass often results in a haze in the film applied and a resultant reduction in transparency. Where the application of such films is contemplated, it is preferred that the glass be alkali-free. However, up to about 1% of an alkali metal oxide may be present in the glass without seriously impairing the suitability of the glass for such applications.

When heat-absorbing glass is exposed to a strong source of radiant energy, the glass becomes heated. The hot glass then becomes a secondary heat radiator. The resultant secondary heat radiation can be partially controlled by the use of transparent low-emissivity films. The characteristics and application of such films are discussed in detail in copending application Ser. No. 100,985. We have found that glasses of the present invention, containing less than about 1% alkali metaloxide or preferably alkali-free, are particularly well adapted for the application of iridized metal oxide films as disclosed in application Ser. No. 100,985, now abandoned. A particular embodiment of the present invention resides in an article, e.g. a window, windshield or the like, comprising a heat-absorbing glass of the aforementioned alkali-free or low alkali content composition and a low emissivity iridized metal oxide film on one surface thereof.

Figure 2:
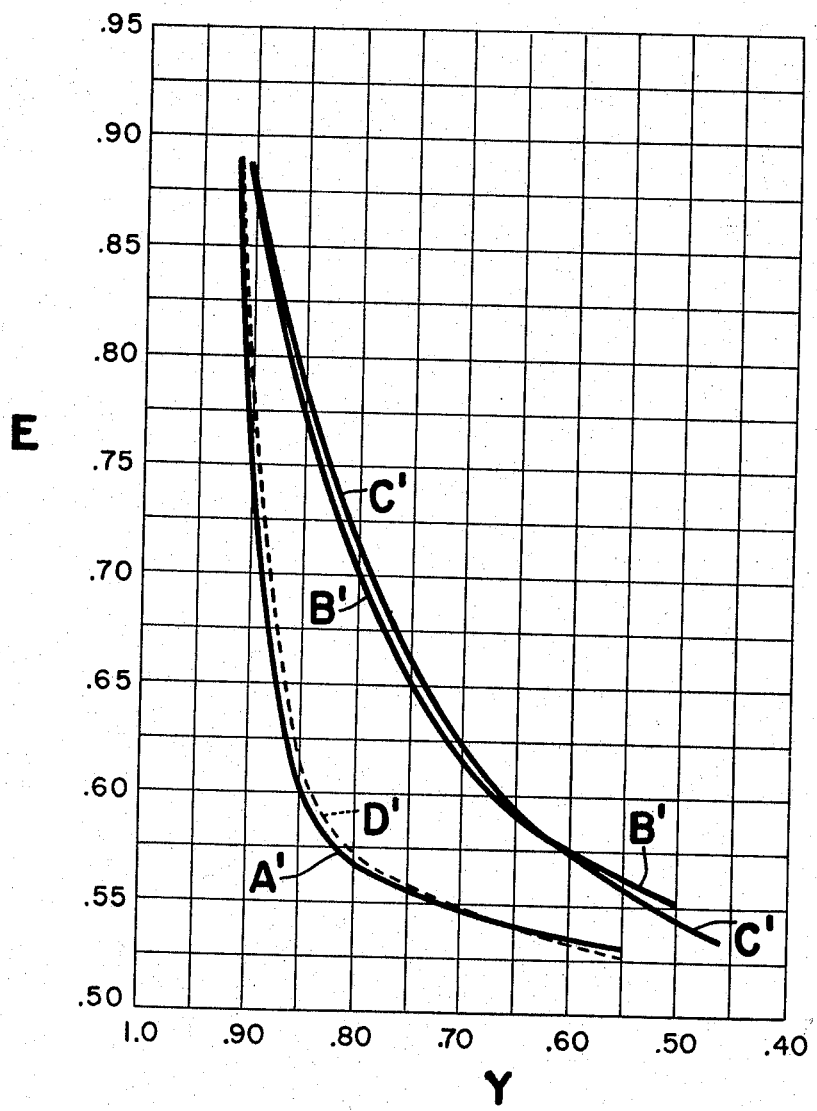

In the drawings, the relationship of the heat-absorption efficiency of a preferred glass of the present invention to the heat-absorption efficiency of various prior art glasses, is shown. The curves represent the heat-absorption efficiency of the glasses as a plot of the fraction of energy transferred (E) and luminous transmission (Y). FIG. 1 represents the values of energy transferred vs. luminous transmission of the various glasses in response to radiant energy between 400 m$\mu$ and 2000 m$\mu$. This range was selected as representative of a sunlight source of energy. FIG. 2 represents the values of energy transferred vs. luminous transmission of the various glasses in response to an energy distribution curve equivalent to that of a 3000° K. tungsten lamp. Each curve is based on energy transferred (E) and luminous transmission (Y) values determined for three different thicknesses of glass, 2.5, 5.0 and 10.0 mm. The fraction of energy transferred (E) represents the total of the energy transmitted ($E_{tr}$) and the portion of energy reemitted ($E_R$) in a direction away from the light source, divided by the total energy falling on the glass surface. This may be stated in equation form by the expression $$E = \frac{E_R + E_{tr}}{E \text{ total}}$$

The luminous transmission (Y) represents the fraction of light transmitted by the glass.

Curves A and A' represent the heat-absorption efficiency of a commercial heat-absorbing phosphate glass sold by Corning Glass Works under the designation Code No. 4600. Curves B and B' represent the heat-absorption efficiency of a commercial heat-absorbing lime-soda glass having the approximate composition in weight percent: 72% $SiO_2$, 2% $Al_2O_3$, 12% $Na_2O$, 14% $CaO$, 1.0% $Fe_2O_3$. Curves C and C' represent the heat-absorption efficiency of a prior art heat-absorbing aluminosilicate glass having the following approximate composition in percent by weight: 46.7% $SiO_2$, 11.0% $Al_2O_3$, 18.5% $CaO$, 13.2% $MgO$, 5.5% $Na_2O$, 0.5% $FeO$ and 4.7% $ZnO$. Curves D and D' represent the heat-absorption efficiency of a preferred glass of the present invention.

Figure 3:
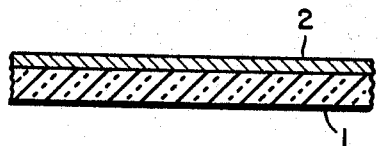

FIG. 3 represents a cross-sectional view of a window or other article in accordance with the present invention, wherein a heat-absorbing glass pane 1 has been provided with a low emissivity iridized metal oxide film 2.

The glasses of the present invention may be formulated from conventional raw materials well known to those skilled in the art. Furthermore, they may be melted in accordance with conventional glass melting practice. The following example illustrates the formulation of the preferred glass described in the preceding paragraph.

EXAMPLE I

| Batch Ingredients, lbs. | | Theoretical composition of glass (in wt. percent as calculated from the batch) | |
|---|---|---|---|
| Sand | 1,000 | $SiO_2$ | 49.0 |
| Calc. $Al_2O_3$ | 420 | $Al_2O_3$ | 20.6 |
| Anhyd. $B_2O_3$ | 180 | $B_2O_3$ | 8.8 |
| Fluorspar | 82 | F | 2.0 |
| Limestone | 325 | CaO | 11.8 |
| MgO | 80 | MgO | 3.9 |
| ZnO | 80 | ZnO | 3.9 |
| $Fe_2O_3$ | 20 | FeO | .9 |
| Cornstarch | 60 | | |
| | | | 100.9 |
| Oxygen Correction Factor | | | −0.9 |
| | | | 100.0 |

Physical Properties:
  Softening Point, ° C ____ 856
  Expansion ____ 41.3×10⁻⁷
  Liquidus Temperature, ° C ____ 1,097

The batch ingredients were melted on a 40 hour melting schedule in a 2500 lb., gas-fired, clay pot at a maximum temperature of 1425° C. The heat-absorbing characteristics of the resulting glass are represented by curves D and D' of FIGS. 1 and 2.

A sample of the glass described in Example I was tested for weather resistance in the following manner: a sample of the glass was placed in a weather cabinet and subjected to a humidity cycle which consisted of maintaining the relative humidity (R.H.) in the cabinet at 98% for 2 hours, lowering the R.H. over a period of ½ hour to 75% R.H., maintaining for 1 hour and then raising the R.H. over a period of ½ hour to 98% R.H. and repeating the cycle continuously while maintaining a constant temperature of 50° C. After 12 weeks, a slight haze formed on the sample resulting in a 1.3% loss in luminous transmission. In contrast to this, a sample of the aforementioned phosphate glass, Code No. 4600, was subjected to a less severe test by placing it in a weathering cabinet at 85% R.H. and a constant temperature of only 30° C. In spite of the less severe conditions, after only 4 days, the sample became badly fogged with the development of a translucent surface layer and the test was discontinued.

To further illustrate the invention, the following examples (2 to 5) show the batch composition, theoretical composition and physical properties of four glasses, typical of the glasses of the present invention.

EXAMPLES 2-5

| | 2 | 3 | 4 | 5 |
|---|---|---|---|---|
| Batch Composition (in parts by wt.): | | | | |
| Sand | 200 | 275 | 339 | 200 |
| Calc. Alumina | 100 | 75 | 102 | 84 |
| Boric Acid | 100 | 50 | 36 | 36 |
| Zinc Oxide | 50 | 50 | 24 | 16 |
| Limestone | 63.6 | 63.6 | 38.4 | 57.7 |
| Dolomitic Limestone | | | 84.4 | |
| Iron Scale | 10 | 10 | 6.7 | 4 |
| Fluorspar | 20.5 | 20.5 | | 16.4 |
| Soda Ash | | | | 13.7 |
| Barium Carbonate | | | 48.5 | |
| Magnesia | | | | 12 |
| Cornstarch | 15 | 15 | 18 | 12 |
| Theoretical Composition (in wt. percent): | | | | |
| $SiO_2$ | 38.8 | 53.3 | 55.6 | 49.0 |
| $Al_2O_3$ | 19.4 | 14.6 | 16.7 | 20.6 |
| $B_2O_3$ | 19.4 | 9.7 | 5.9 | 8.8 |
| ZnO | 9.7 | 9.7 | 3.9 | 3.9 |
| CaO | 9.8 | 9.8 | 7.7 | 10.8 |
| MgO | | | 3.0 | 2.9 |
| F | 2.0 | 2.0 | | 2.0 |
| FeO | 1.8 | 1.8 | 1.0 | 0.9 |
| $Na_2O$ | | | | 2.0 |
| BaO | | | 6.2 | |
| | 100.9 | 100.9 | 100.0 | 100.9 |
| Oxygen Correction Factor | −0.9 | −0.9 | | −0.9 |
| | 100.0 | 100.0 | 100.0 | 100.0 |
| Physical Properties: | | | | |
| Soft. pt. (° C.) | 793 | 847 | 919 | 814 |
| Coefficient of Exp. (×10⁻⁷) | 39.2 | 38.7 | 40.4 | 46.6 |
| Fraction of energy transferred (E): 400 mμ to 2,000 mμ wavelength source: | | | | |
| Y=0.80 | .692 | .695 | .695 | .690 |
| 0.70 | .643 | .650 | .648 | .645 |
| 0.60 | .612 | .615 | .616 | .610 |
| Tungsten filament at color temp. of 3,000° K.: | | | | |
| Y=0.80 | .580 | .585 | .600 | .590 |
| 0.70 | .550 | .555 | .552 | .550 |
| 0.60 | .535 | .540 | .535 | .535 |

It will be readily apparent to those skilled in the art that variations and modifications of the ingredients and conditions described herein may be made without departing from the spirit or scope of the invention. Batch materials other than those shown in the examples may be substituted to yield the desired oxides in the glass. For example, iron may be incorporated in the batch in the form of ferrous oxalate.

What is claimed is:

1. A low expansion heat-absorbing glass consisting essentially of, by weight, 35–70% $SiO_2$, 5–30% $Al_2O_3$, 4–25% $B_2O_3$, 2–25% of a divalent metal oxide selected from the group consisting of ZnO, CdO and mixtures thereof, 5–30% of a divalent metal oxide selected from the group consisting of CaO, MgO, BaO and mixtures thereof, 0–5% of an alkali metal oxide selected from the group consisting of $Na_2O$, $K_2O$, $Li_2O$ and mixtures thereof, 0–3% fluoride and 0.25–5% FeO.

2. A low expansion, heat-absorbing glass consisting essentially of, by weight, 35–70% $SiO_2$, 5–30% $Al_2O_3$, 4–25% $B_2O_3$, 2–25% of a divalent metal oxide from the group consisting of ZnO, CdO and mixtures thereof, 5–30% of a divalent metal oxide selected from the group consisting of CaO, MgO, BaO and mixtures thereof, 0–1% of an alkali metal oxide selected from the group consisting of $Na_2O$, $K_2O$, $Li_2O$ and mixtures thereof, 0–3% fluoride and 0.25–5% FeO.

3. An alkali-free, heat-absorbing glass consisting essentially of, by weight, 35–70% $SiO_2$, 4–25% $B_2O_3$, 5–30% $Al_2O_3$, 2–25% of a divalent metal oxide from the group consisting of ZnO, CdO and mixtures thereof, 5–30% of a divalent metal oxide selected from the group consisting of CaO, MgO, BaO and mixtures thereof, 0–3% fluoride and 0.25–5% FeO.

4. A low expansion, heat-absorbing glass consisting essentially of about 49.0% $SiO_2$, 20.6% $Al_2O_3$, 8.8% $B_2O_3$, 3.9% ZnO, 11.8% CaO, 3.9% MgO, 2.0% F and 0.9% FeO.

5. A low expansion, heat-absorbing glass produced from a batch consisting essentially of, in parts by weight,

| | Parts by weight |
|---|---|
| Sand | 1000 |
| Calc. alumina | 420 |
| Boric acid (anhyd.) | 180 |
| Fluorspar | 82 |
| Limestone | 325 |
| Magnesia | 80 |
| Zinc oxide | 80 |
| Iron scale | 20 |
| Cornstarch | 60 |

6. An article comprising a low expansion, heat-absorbing glass sheet consisting essentially of, by weight, 35–70% $SiO_2$, 5–30% $Al_2O_3$, 4–25% $B_2O_3$, 2–25% of a divalent metal oxide selected from the group consisting of ZnO, CdO and mixtures thereof, 5–30% of a divalent metal oxide selected from the group consisting of CaO, MgO, BaO and mixtures thereof, 0–1% of an alkali metal oxide selected from the group consisting of $Na_2O$, $Li_2O$, $K_2O$ and mixtures thereof, 0–3% fluoride and 0.25–5% FeO, said glass sheet having a transparent, low emissivity iridized metal oxide film on a surface thereof.

7. An article in accordance with claim 6 wherein said glass sheet is substantially alkali-free.

References Cited

UNITED STATES PATENTS

| | | | |
|---|---|---|---|
| 2,688,561 | 9/1954 | Armistead | 106—54 |
| 2,714,558 | 8/1955 | Brown | 106—54 |
| 2,748,006 | 5/1956 | Kreidl et al. | 106—54 |
| 3,010,836 | 11/1961 | Upton et al. | 106—54 |

FOREIGN PATENTS

| | | |
|---|---|---|
| 396,015 | 7/1933 | Great Britain. |

HELEN M. McCARTHY, *Primary Examiner.*